United States Patent
Blachowicz et al.

(10) Patent No.: US 6,754,581 B1
(45) Date of Patent: Jun. 22, 2004

(54) AIR TRAVEL INFORMATION AND COMPUTER DATA COMPILATION, RETRIEVAL AND DISPLAY METHOD AND SYSTEM

(75) Inventors: Scott Blachowicz, Bothell, WA (US); Larry Brasfield, Mercer Island, WA (US); Feng Chen, Houston, TX (US); Roberto Cormack, Houston, TX (US); Barry Davis, Shoreline, WA (US); Rose Dossett, Houston, TX (US); David Helms, Houston, TX (US); Dennis Howard, Seattle, WA (US); John Legh-Page, Houston, TX (US); Craig Paynter, Renton, WA (US); Randy Robertson, Kirkland, WA (US); Jim Rouse, Missouri City, TX (US)

(73) Assignee: AR Group, Inc., Houston, TX (US)

( * ) Notice: Subject to any disclaimer, the term of this patent is extended or adjusted under 35 U.S.C. 154(b) by 151 days.

(21) Appl. No.: 10/004,671

(22) Filed: Dec. 4, 2001

(Under 37 CFR 1.47)

Related U.S. Application Data

(63) Continuation-in-part of application No. 09/421,167, filed on Oct. 19, 1999, now Pat. No. 6,353,794.

(51) Int. Cl.$^7$ .............................................. G01C 21/00
(52) U.S. Cl. ...................... 701/202; 701/207; 701/208; 455/456; 342/36
(58) Field of Search ................................ 701/202, 201, 701/200, 206, 207, 208, 211; 340/990, 995, 991, 993; 455/456; 342/36

(56) References Cited

U.S. PATENT DOCUMENTS

| | | | | |
|---|---|---|---|---|
| 5,802,492 A | * | 9/1998 | DeLorme et al. | 455/456.5 |
| 5,948,040 A | * | 9/1999 | DeLorme et al. | 701/201 |
| 6,353,794 B1 | * | 3/2002 | Davis et al. | 701/201 |

\* cited by examiner

*Primary Examiner*—Thomas G. Black
*Assistant Examiner*—Arthur D. Donnelly
(74) *Attorney, Agent, or Firm*—Haynes and Boone LLP; Todd Mattingly

(57) ABSTRACT

A system, method, and computer program is disclosed for managing integrated real-time information about air flight trips, providing that information to multiple users, and receiving feedback from multiple users. A plurality of user interfaces are provided for displaying a plurality of types of information about a real time progress air trips as planned by an operational center. A communication channel is provided for receiving feedback information from the users and associating that feedback with a particular aspect of the trip.

40 Claims, 16 Drawing Sheets

AIR TRAVEL INFORMATION AND COMPUTER DATA COMPILATION, RETRIEVAL AND DISPLAY METHOD AND SYSTEM

CROSS-REFERENCE

The present invention is a Continuation-In-Part application of U.S. patent application Ser. No. 09/421,167, filling date Oct. 19, 1999 now U.S. Pat. No. 6,353,794 which is incorporated herein by reference in its entirety.

BACKGROUND OF THE INVENTION

The present invention relates generally to dissemination of air travel information, and more particularly, to a system and method for selecting, compiling, retrieving, and displaying computer stored air travel information data.

Aviation service providers plan and execute air travel trips for clients by making arrangements with vendors who provide facilities and services necessary to carryout a trip. The provider typically receives from a client a request for specific services relating to a specific air travel trip along with the basic trip plan, including starting and ending points and schedule requirements. The provider must then create a comprehensive trip plan that includes arrangements with various vendors for a wide variety of services both for the aviator and for travelers. A comprehensive service package could include arrangements for airport landing space, fueling, ground transportation, security personnel, hotel accommodations and the like. To keep track of and manage the elements of the services package, providers have used various commercially available software packages and relational databases that enable the provider to organize and store data relating to the elements of the air travel trip. Those packages are generally static information storage and retrieval systems. An improvement on those static systems is disclosed and claimed in the commonly assigned U.S. Pat. No. 6,353,794 (application Ser. No. 09/421,167) entitled Air Travel Information and Computer Data Compilation, Retrieval and Display Method and System, the entirety of which is hereby incorporated herein by reference. The Air Travel Information System includes a system and method that provides an air traveler, dispatcher, or vendor with direct access to a multiplicity of trip details, as they happen in real-time through a series of user friendly, well organized screen displays. The efficiency of the System in responding to customer concerns or changes is improved by providing a communication channel that incorporates customer supplied information into the Air Travel System. The invention disclosed and claimed in this application addresses that efficiency need by adding to the System an integrated, dynamic communications function that enables making changes to arrangements in response to changes in client needs or other factors affecting the comprehensive trip plan.

SUMMARY OF THE INVENTION

A system, method, and computer program is disclosed for managing integrated real-time information about air flight trips, making that information available to multiple users in real time with a communication channel integrated with the information system for incorporating information received from remote users into the System. A plurality of user interfaces are provided for displaying a plurality of types of information about real time progress of the at least one trip as planned by an operational center.

The present invention thus provides and manages integrated real-time flight information for multiple authorized users, dispatchers, vendors, and clients. With the help of a computer, a handheld device, or any similar computing device that can access a website, a remote user can log into a network based data service and have direct access to view trip plans and details as they happen in real-time. Information about airport, computerized flight plans, aircraft location customized weather maps, historical data, billing information, and the like, are all available at the fingertip of the users. Relevant users can access needed information pertaining to one or more scheduled, in progress, or completed flights for which they are responsible, at any time, in any place, by using a dial-up connection service or an Internet connection. In this way, critical information is available through the access connection about the status of all flight-related factors such as customs, permits, catering, ground transportation, slots, and flight plans at close to animation speeds. Remote users can provide in context feedback that is incorporated into the real time information database.

BRIEF DESCRIPTION OF THE DRAWINGS

FIG. 15b is a flow diagram illustrating a process in supporting the operation of a remote user screen display and the communication channel of FIG. 15a.

DESCRIPTION OF A PREFERRED EMBODIMENT

Figure 1:
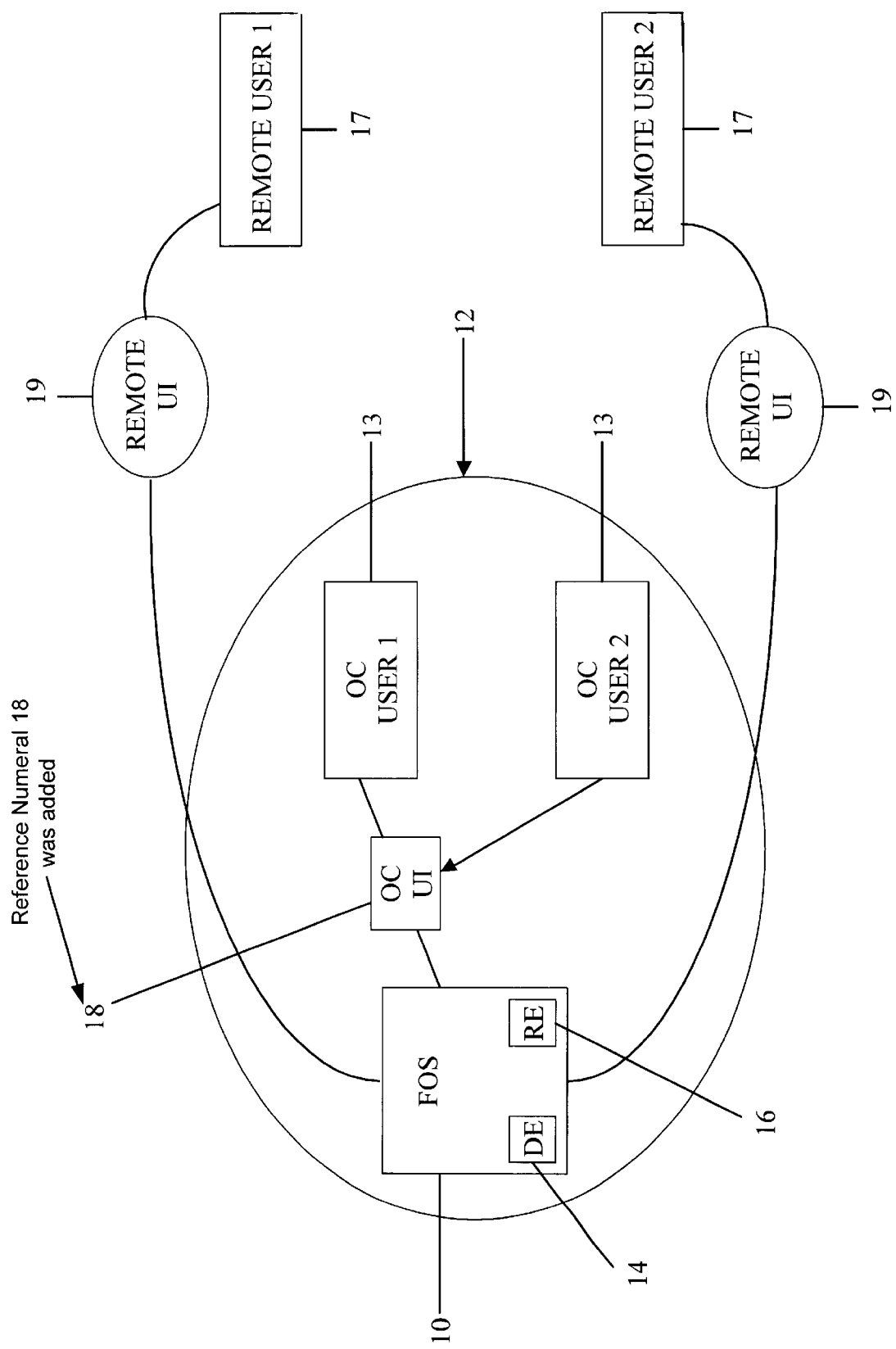
FIG. 1 illustrates an overview of a flight operations system (FOS) according to one embodiment of the present invention.

FIG. 1 is a block diagram providing an overview of flight operations system (FOS) 10 in accordance with the present invention. The FOS 10 can be conveniently housed in a central location, such as an operational center (OC) 12 maintained by a flight operations service provider, where flight operators 13 can enter, access, update and change information about customers and services maintained in the FOS 10, preferably through a tightly controlled local area network.

The FOS 10 includes a software Data Engine (DE) 14 for processing various data stored in a computer database, and a software Render Engine (RE) 16 that is responsible for graphic or animation data processing. The RE 16 is dedicated to processing graphic images such as a flight map in which a geographic location of an aircraft can be shown. The DE 14 stores an object relational representation of back-end SQL data in memory.

Other authorized users, such as the remote users 17 can also reach the FOS 10 from another location by making a communication link to the FOS 10 from a distant user terminal. The distant user terminal can be a fixed computer terminal in an airport or any computing device with Internet connection capability. In essence, the FOS 10 becomes an Application Service Provider where different users, depending on the access privileges given them by the FOS 10, can read, print and respond to information provided by the FOS through the various user interface screens.

The flight operators 13 at the OC 12 can enter, review, or alter information in the FOS 10 at the OC 12 by way of operator user interface 18. The changed information will be available for viewing immediately to users having access privileges to the data by way of remote user interface 19. As can be appreciated, many of the interfaces 18 and 19 can be the same screen displays with the information displayed being filtered by the FOS 10 according to data access privileges assigned by the FOS 10. As described below in more detail, the FOS 10 also provides a feedback communication channel for selected users to send messages with relevant information directly to the OC database, under control of the FOS 10, where the message is tied to the context in which it was sent.

In order to integrate air travel and related information for planning and executing trips involving at least one flight, the FOS 10 collects the air travel and related information, updates the air travel and related information, and makes available real time updates of air travel and related information through computer networks. The air travel and related information can include trip identification information, tasks to be and being performed during a trip, and environmental factors affecting the trip. The basic trip identification information preferably includes a uniquely assigned number representing the trip, a tail number for a designated aircraft, and the name of a pilot for the aircraft making the trip. Environmental factors can include real time weather information, such as wind speed and air temperature, and satellite radar images. Task information covers various services scheduled, in progress and completed. The FOS 10 makes all of this information available to flight operators 13, and makes selected, filtered information available to remote users 17 when connected to the FOS 10, as illustrated in FIG. 1, in real time. In other words, once a connection is made, the most current information is available to both the flight operators 13 and the remote users 17 without the need to wait until the flight related information is "pushed" from the FOS 10. Remote users 17 can effectively "pull" the information from the FOS 10 whenever they connect to the FOS 10.

By way of user interfaces (UI's) provided by the FOS 10, flight operators 13 or remote users 17 can view information on the FOS 10 to the extent that they are granted access rights to do so. As illustrated in FIGS. 2 through 12, several categories of user interface (UI) screens are available for entering and viewing trip related information. A single trip may include many different "legs," each leg involving a take off and landing. In other words, the term "leg" refers to a trip segment between any two airports. For example, if an aircraft travels from Austin through Houston to Dallas, Texas, the entire trip has two legs, which is the one from Austin to Houston, and the other from Houston to Dallas. When the operational center 12 plans a trip for the client, it may be responsible for making arrangements with a variety of vendors on behalf of the client for each leg of a trip, such as aircraft ground handling, fuel, ground transportation, permits, security and hotel accommodations for passengers. All of these tasks are time, route and vendor personnel dependent. Rapid and effective communication of information among the aviation service provider at the operational center 12 and all vendors and clients can greatly enhance the value of the services provided by the operational center.

Figure 2:
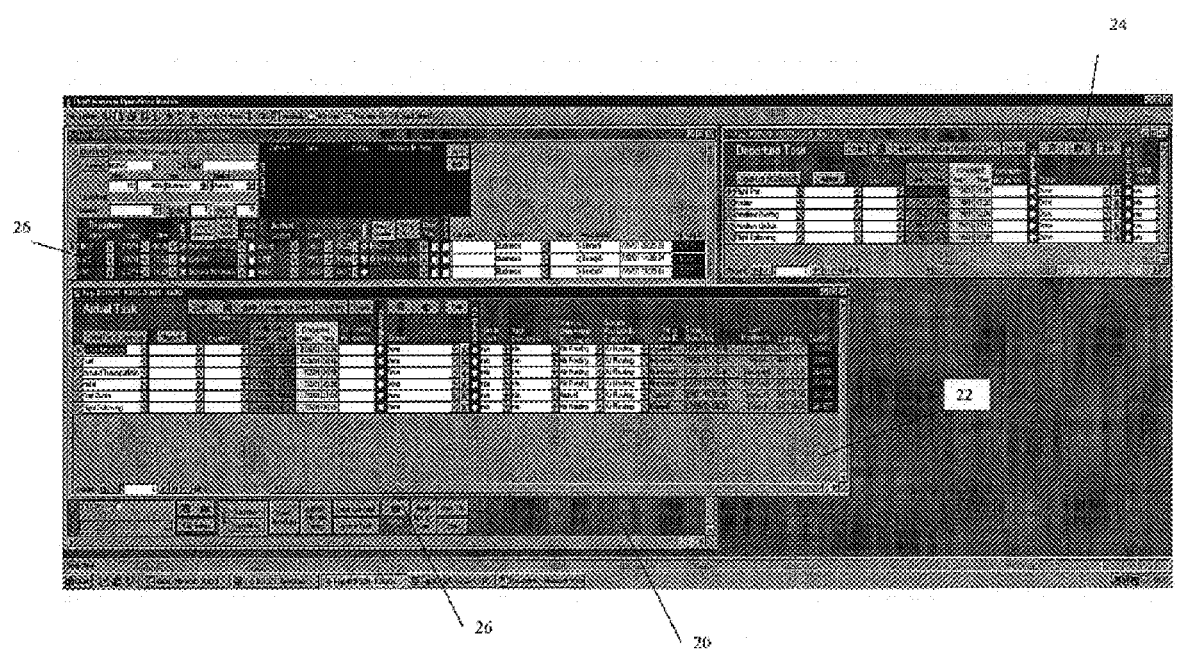
FIG. 2 illustrates operation user interface screens such as a Trip Setup Screen, Arrival Task Screen, and Departure Task Screen.

Turning now to the manner in which the FOS 10 facilitates that communication of information, with reference to FIG. 2, a starting point for entering trip specific information is illustrated as Trip Setup Screen 20. The Trip Setup screen 20 provides GUI buttons for flight operators 13 to invoke Arrival Task screen 22 and Departure Task screen 24 and to enter free text or copied text information for inclusion in Notes folder 26. For example, the Trip Setup Screen 20 (shown in FIG. 2 behind the Arrival Task screen 22) is used by the flight operator 13 as a starting point to input client-requested task data relating to a trip, including details relating to services to be rendered by the aviation service provider at the departure end of the trip by way of the Departure Task screen 24 and service details relating to the arrival end by way of the Arrival Task screen 22.

Figure 3:
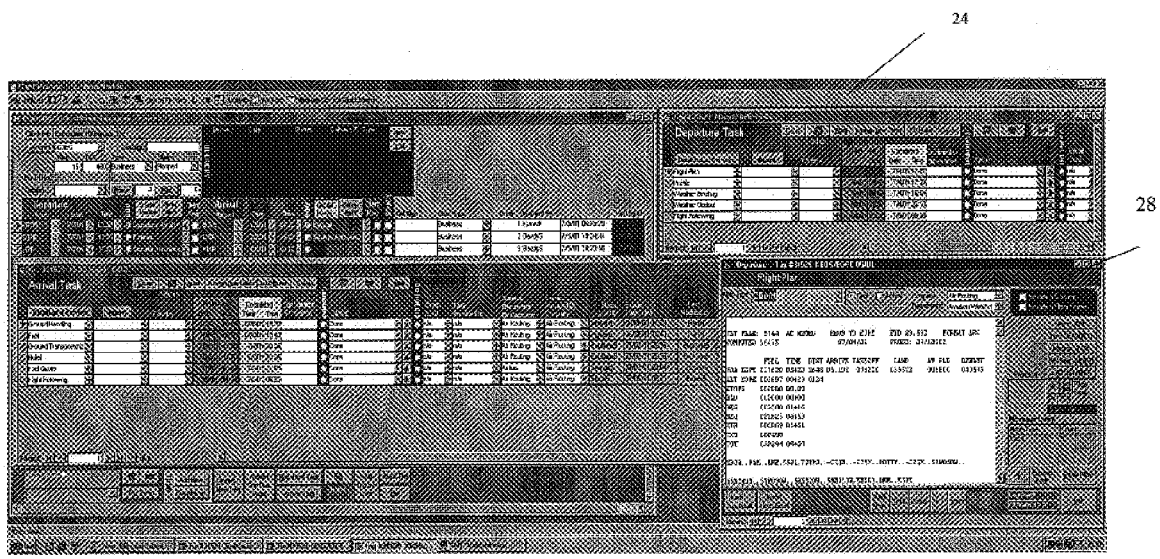
FIG. 3 illustrates a Notes Screen.

With reference to FIG. 3, invoking the Notes folder 26 from the Departure Task screen 24 enables a flight operator 13 to post, for example, a flight plan 28. When a flight operator 13 posts the flight plan 28 as a "Client Note Type," the FOS 10 makes it immediately available, when the users 17 make a connection to the FOS 10, for viewing and printing by users 17 having access privileges to Client Notes for the particular trip with which the FOS 10 has associate the particular note.

Figure 4:
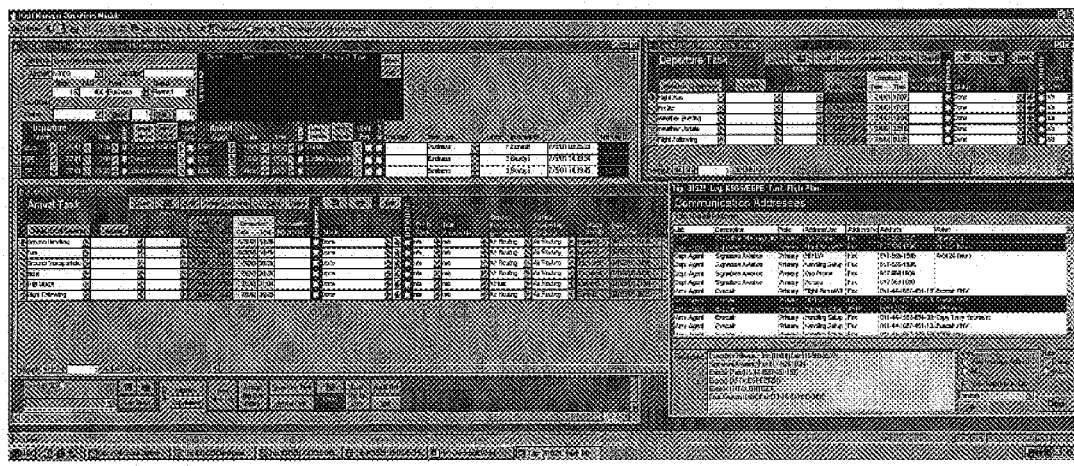
FIG. 4 illustrates a Communication Address Screen.

With reference to FIG. 4, information for means of direct communications with vendors and clients of the aviation service provider can be conveniently entered and viewed by the flight operators 13 by way of Communications Address Screen 30.

Figure 5:
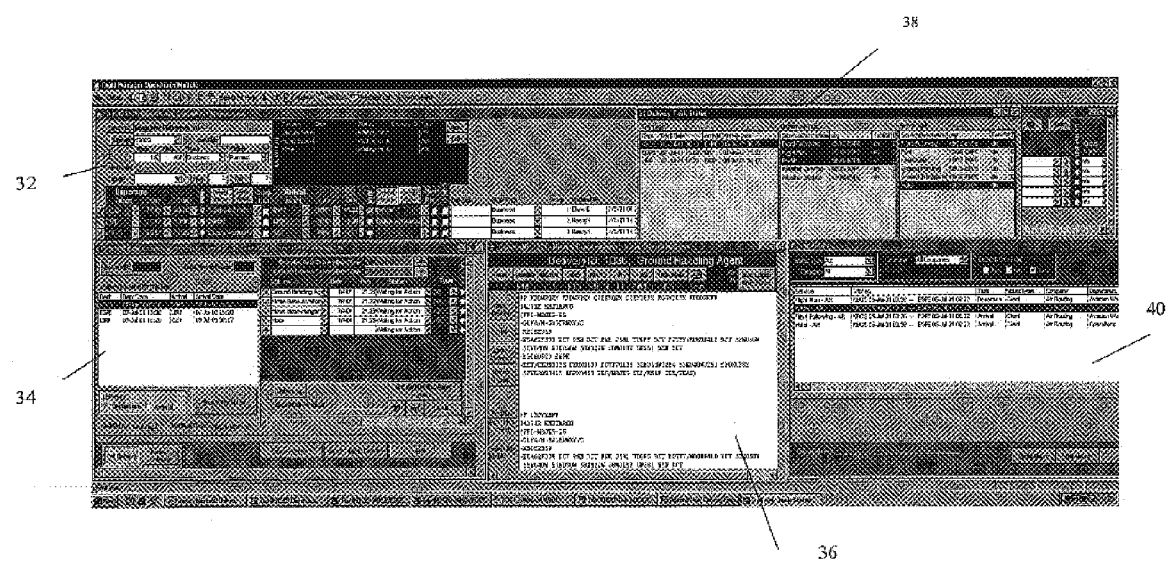
FIG. 5 illustrates a Delivery Setup Screen, Delivery Status Screen, Delivery Notes Screen, Delivery Task Status Screen, and Trip Notes Screen.

FIG. 5 illustrates how the FOS 10 organizes and manages details relating to services managed for delivery to the aviation service provider's client. For example, a particular Trip for a particular client is selected and displayed in Delivery Setup Screen 32 to enable viewing of the status of all tasks, e.g., by way of Delivery Task Status screen 38. In this viewing mode, a flight operator can add a new deliverable for the trip using the Append New Delivery Transaction screen 34. The flight operator can view previously entered notes relating to this new entry by way of the Trip Notes folder 26 associated with the selected trip by selecting the appropriate note from the Trip Notes display 36 to invoke Trip Notes screen 40. Once a new delivery transaction is appended, it will show up in the Delivery Task status screen 38 and will be available for viewing by users with access to this particular trip, as assigned by the FOS 10.

Figure 6:
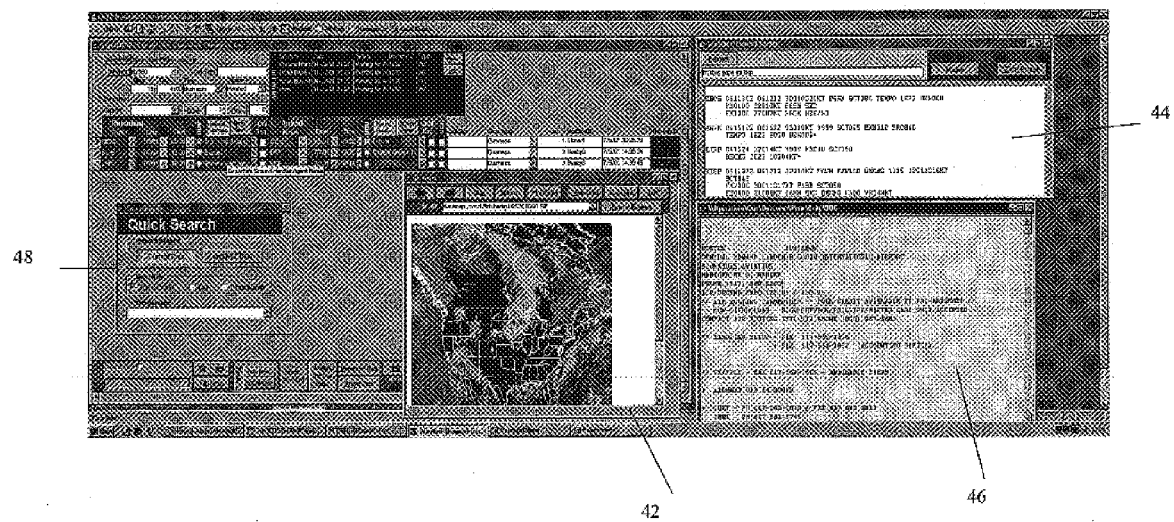
FIG. 6 illustrates a Weather Image Screen and Text Weather Request Screen.

FIG. 6 illustrates a Weather Image Screen 42, a Text Weather Request Screen 44, Airport Data Screen 46, and Quick Search Screen 48. Once a search for a particular trip is entered, corresponding weather information is brought up by these three screens including the satellite weather image as shown in the Weather Image Screen 42. The Airport Data Screen 46 gives contact information for various related personnel in or around the particular airport.

Figure 7:
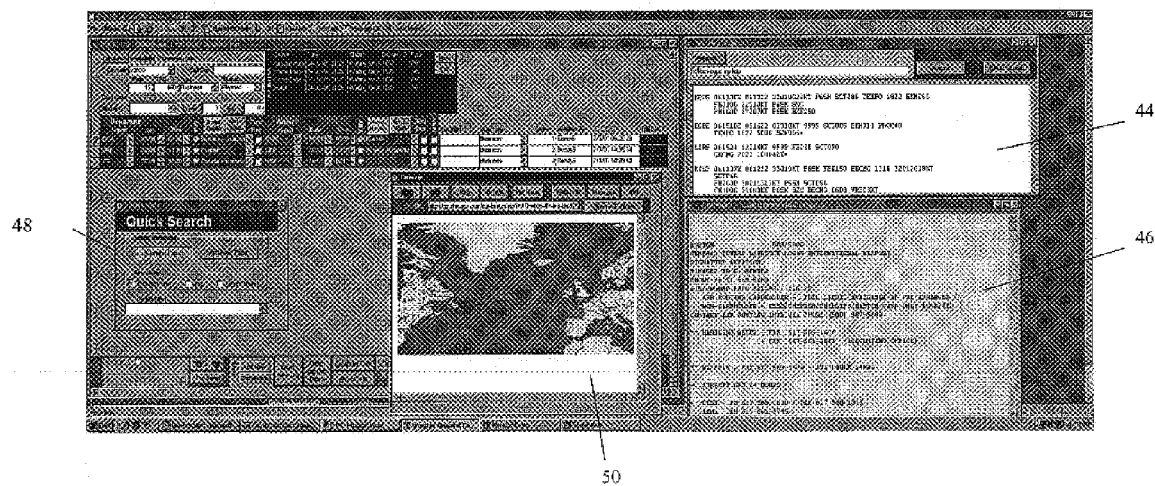
FIG. 7 illustrates a Flight Route Screen.

FIG. 7 illustrates a Flight Route Screen 50 in addition to other screens as illustrated in FIG. 6. The Flight Route Screen 50 graphically presents a flight route for the scheduled flight on behalf of a particular client.

Figure 8:
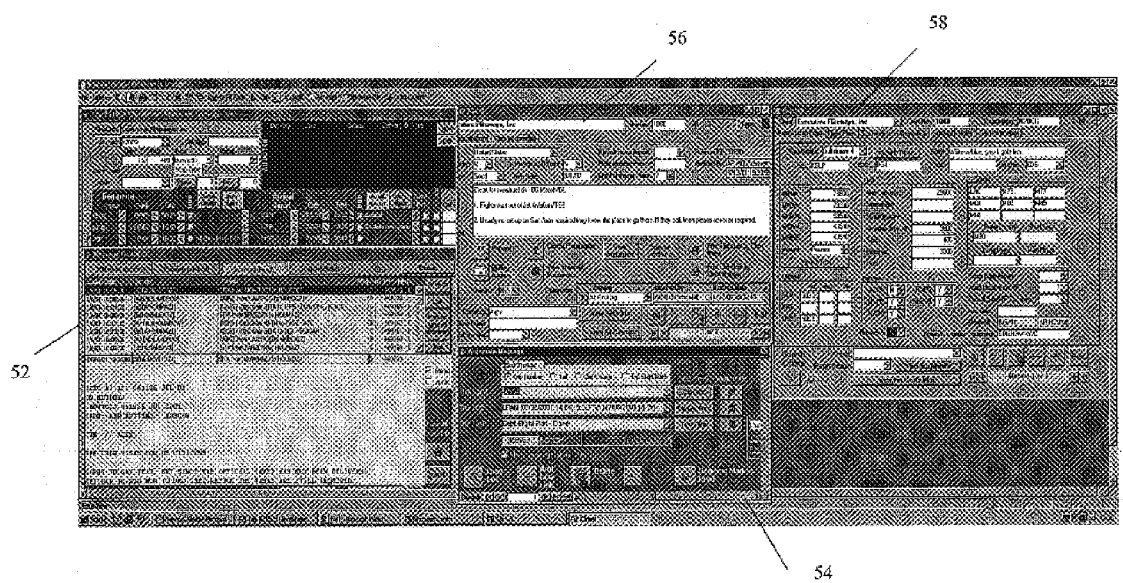
FIG. 8 illustrates a Message Center Screen, Client Data Screen, Message Link Screen, and Aircraft Data Screen.

FIG. 8 illustrates screens for displaying information submitted through the communication channel from remote users to the OC, including a Message Center Screen 52 for displaying a list of all messages received by the OC and displaying the full text of any message selected from the list. When any of the flight operators 13 invoke the Message Center Screen 52, they can view any of the messages received from customers and vendors because, as explained in more detail below, messages sent to the OC through the FOS 10 are entered directly into the database associated with the FOS 10. The list of messages displayed can be sorted by any of the titled fields and are fully searchable by fields and full text. They can be filtered to display only incoming read or unread messages and the status of responses can be viewed. In other words, messages are preferably stored in a fully relational, fully searchable database.

When the Message Center Screen 52 is invoked, other interactive screens associated with communication channel messages are also available. Message Link Screen 54 can be used by any OC user to associate a particular message with related information in the database. As illustrated in FIG. 8, a SITA communication received through the communication channel is highlighted in screen 52 and the user is associating that message with a trip task for a particular trip leg to indicate that the departure flight plan task has been completed for the selected trip number and trip leg. Client Data Screen 56 is available to provide contact information for the customer to facilitate the ability of the flight operator 13 to communicate with the customer. Aircraft Data Screen 58 can also be invoked if the flight operator 13 needs that information to appropriately respond to messages in the Message Center Screen 52.

Figure 9:
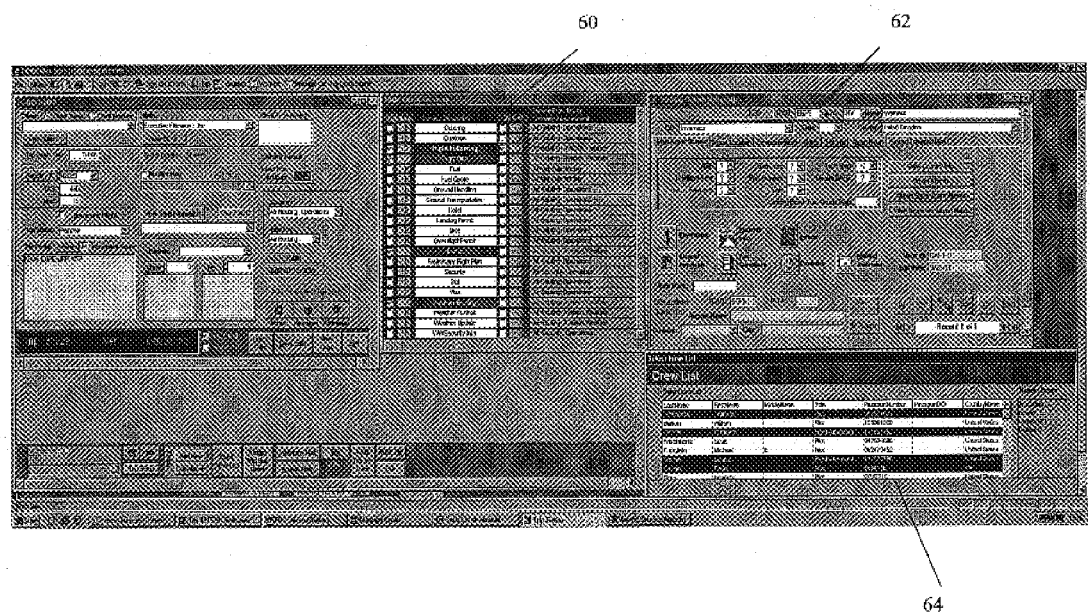
FIG. 9 illustrates a List of Services Screen, Airport Data Screen, and Crew List Screen.

FIG. 9 illustrates other information screens that can be displayed by the flight operator 13 when specific details are needed to accomplish service tasks for customers. Illustrated screens include a List of Services Screen 60, Airport Data Screen 62, and Crew List Screen 64. The List of Services Screen illustrates the scope of services that could be provided and tracked through the FOS 10, such as catering, flight following, fuel, fuel quote, ground handling, ground transportation, hotel, landing permit, overflight permit, security, visa, weather, etc.

Figure 10:
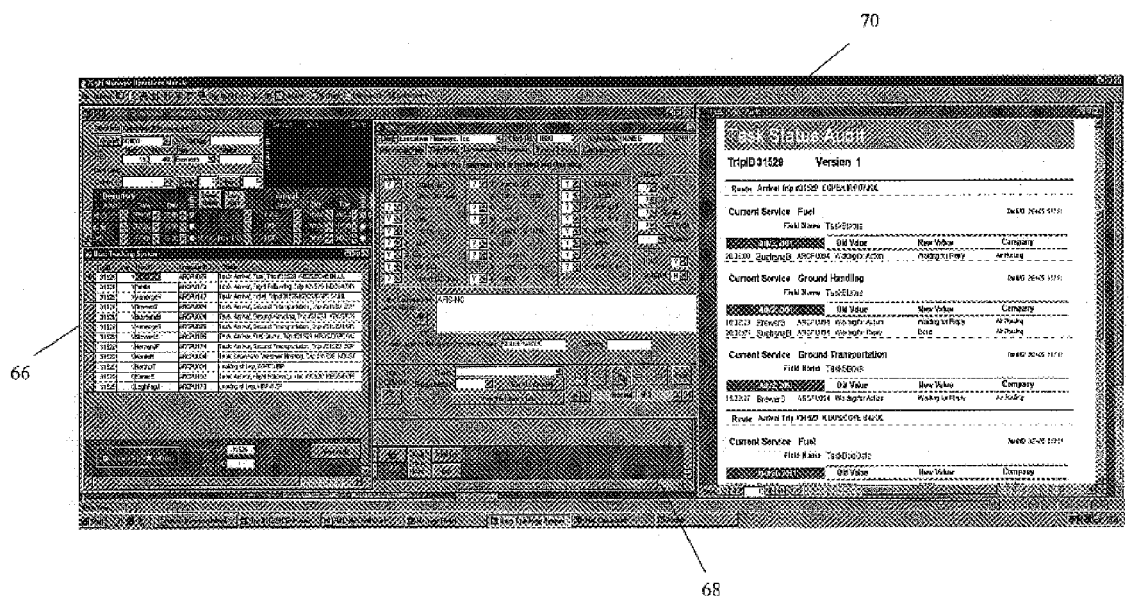
FIG. 10 illustrates a User Tracking Screen, Aircraft Communication Data Screen, and Task Status Audit Screen.

FIG. 10 illustrates a User Tracking Screen 66, Aircraft Communication Data Screen 68, and Task Status Audit Screen 70. These screens allow the OC 12 to monitor who is responsible for what task and what is the real time status for all relevant tasks involved in a trip. The Aircraft Communication Data Screen 68 displays details about available ways for the OC 12 to communicate with the aircraft involved in a particular trip.

Figure 11:
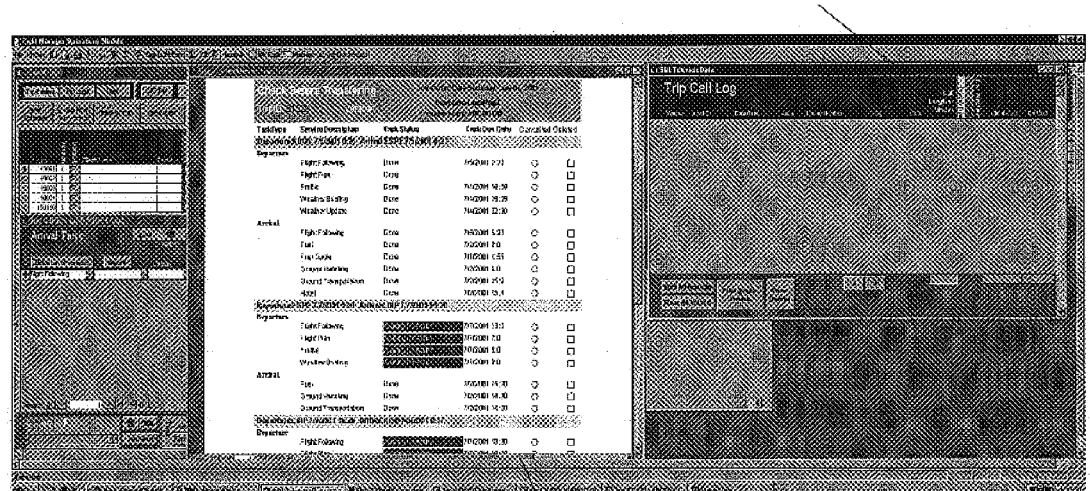
FIG. 11 illustrates a Report Generator Screen and Trip Phone Call Log Screen.
Figure 12:
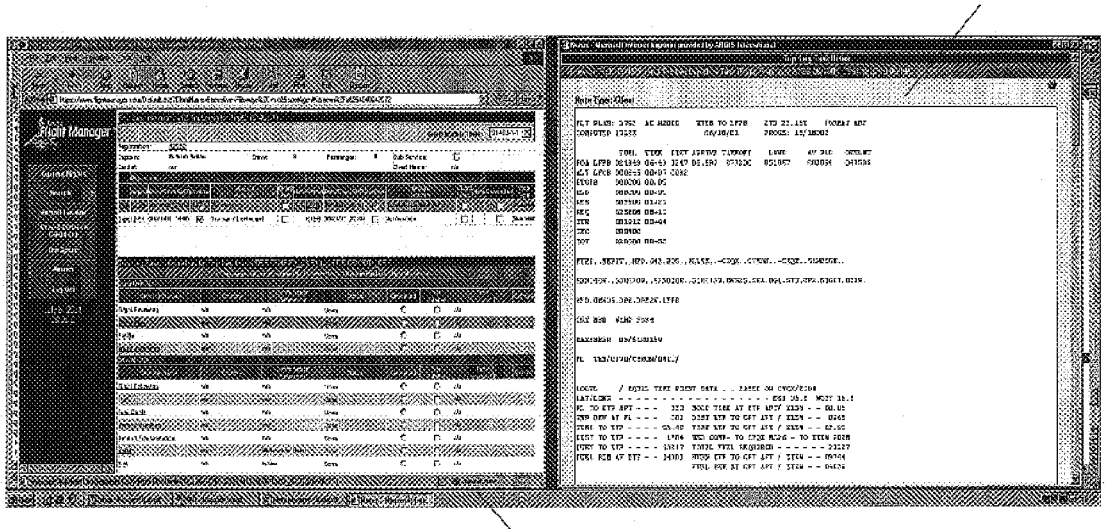
FIG. 12 illustrates a web-based interactive user interface such as a Trip Leg Information Screen and Client Notes Screen.

FIG. 11 illustrates a Report Generator Screen 72 and a Trip Phone Call Log Screen 74. The illustrated report includes all tasks needed for the flight and their immediate status. Other reports may also be generated. For example, if all phone calls must be charged to a particular client, a trip call log may be compiled and presented in the Trip Call Log Screen 74. FIG. 12 illustrates a screen display 76 on a web version showing how a client using any Internet access device can access flight plan 78 for a particular trip as posted by the OC 12.

As mentioned above, contents of the above-described screens can be delivered to, or accessed by, a remote user through an access device such as a handheld computing device with browser software installed thereon. For example, a pilot with a password assigned by the OC 12 can log on to the web-based client or customer portion of the FOS 10 and review contents in a Trip Leg Information Screen 76, and view, download or print a complete summary or brief of the flight from Client Notes Screen 78. Other screens are available for the remote customer users such as a Time and Distance Calculator for calculating time and distance from an arrival airport, a real time weather image screen to show the weather conditions at an airport, as well as general information about the airport and airport-specific current security issues.

Figure 13:
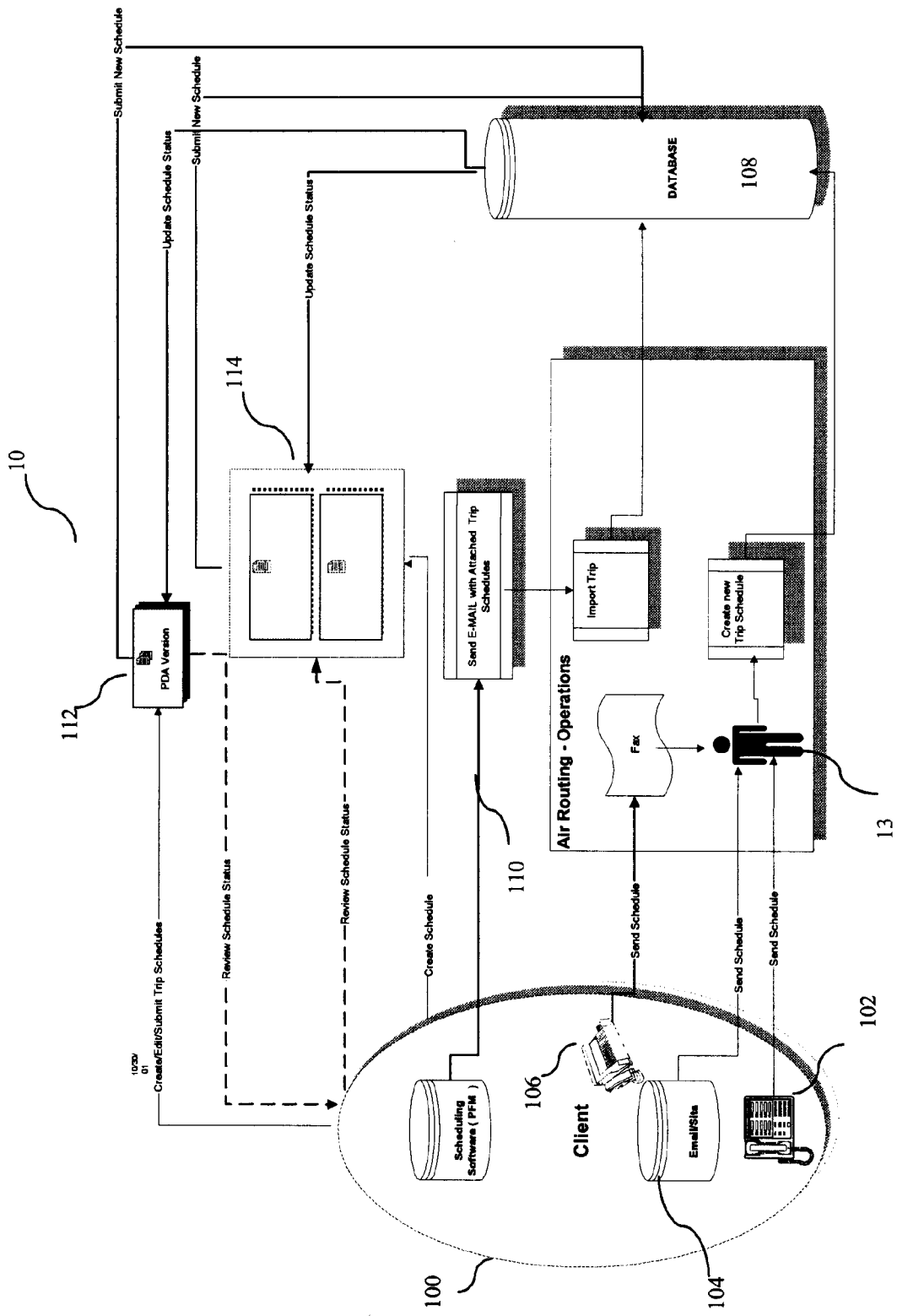
FIG. 13 diagrammatically illustrates a flow of trip schedule information between a client and the operational center according to one example of the present invention.

FIG. 13 illustrates the manner in which the FOS 10 handles the flow of information among the OC 12 and its vendors and clients, in the context of scheduling a trip. The client can initiate action by the OC 12 by sending a schedule through some available communication device 100, such as telephone 102, e-mail 104, or facsimile transmission 106, for receipt by the flight operator 13. When one of those devices is used, the operator 13 receives that information and responds by creating a new Trip Schedule by entering the information supplied by the client into the FOS database 108 by way of the Trip Setup Screen 20 (FIG. 2). Alternatively, the client can send a trip schedule by email attachment 110 that can then be imported into the database 108 without the need for manual data entry. If the user has installed on her personal computing device FOS trip scheduling software 112 supplied by the OC 12, she can submit the schedule information directly to the database 108 using that software and it will be immediately incorporated into the FOS 10 for viewing and editing by authorized users of the FOS 10. Alternatively, a user can submit a schedule by logging onto the FOS 10 website 114 and entering information and submitting it for direct input into the database 108. Once the client initiates a trip by submitting a schedule, the OC 12 begins the process of arranging services necessary for the flight using the information stored in the database 108 concerning the client's preferences, available airports, and vendors servicing those airports, to create departure and arrival tasks using the various screens discussed above. At any time the client can view the progress of that planning by logging onto the website 114 or directly linking to the FOS 10 by way of any communication device, such as a PDA.

Figure 14:
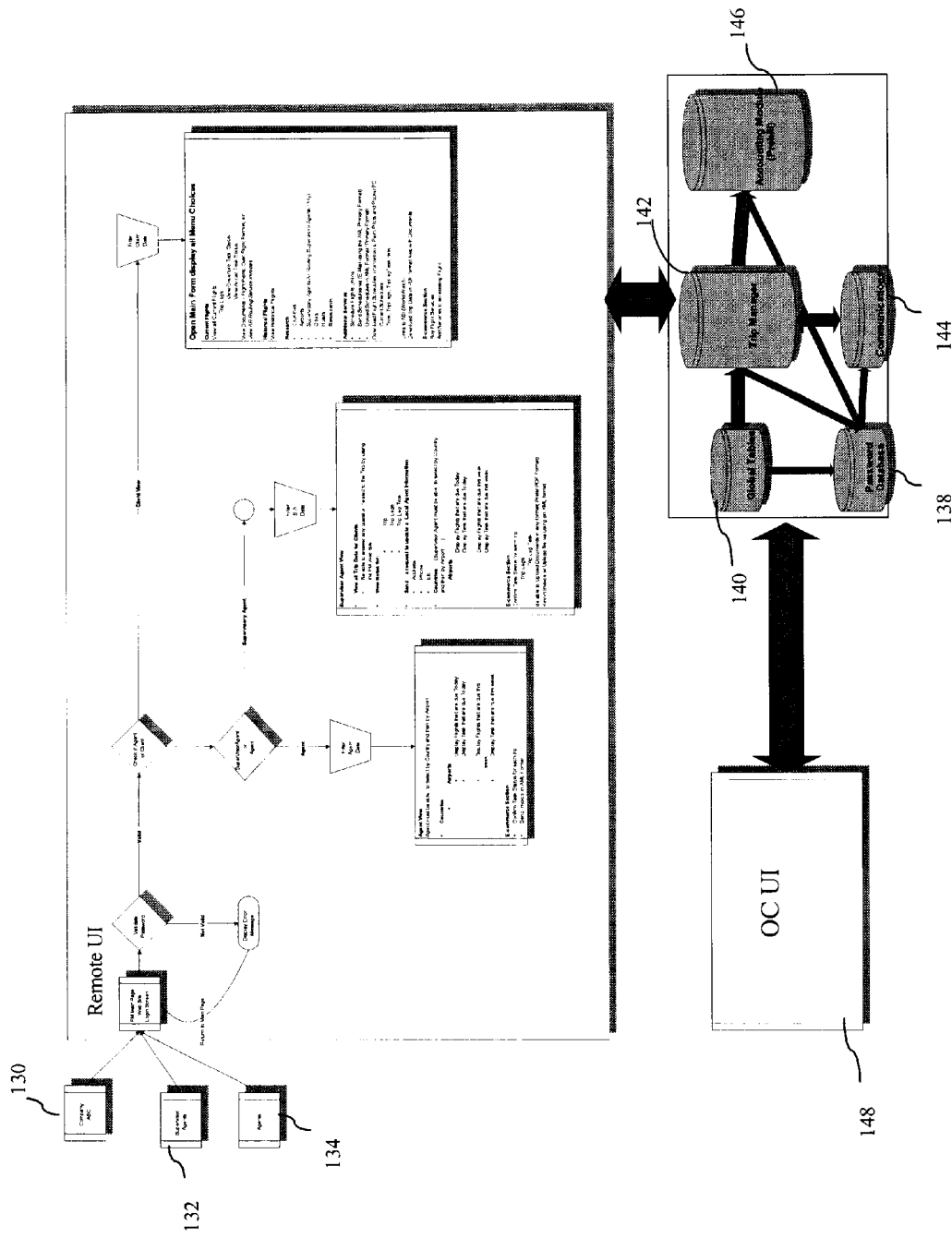
FIG. 14 illustrates a schematic of interfaces among trip schedule, communications, password verification, and account modules with global look up tables in accordance with one example of the invention.

FIG. 14 illustrates the manner in which the FOS 10 controls information available to particular categories of remote users. It shows three categories of users—a client company 130, a supervisory agent 132, and a non supervisory agent 134. When a user logs in, the FOS 10 checks the login information against the password database 138 using global tables 140 to determine the category of user and her association to specific company and trip information. The FOS 10 then filters the trip-related information through a trip manager module 142 so that the user has access only to information relevant to that user. For example, if the user is with the client company 130, only client views and data specific to that client will be available for viewing. If the user is an agent, then only agent views and information specific to that agent, and trips involving that agent, will be available. If the user is a supervisory agent, then information specific to that agent and the agents that she supervises are made available by the FOS 10.

The FOS 10 preferably includes communication module 144 for processing messages submitted through the user interfaces discussed above or messages submitted directly to the OC 12 through other channels, such as by facsimile or email to the specific FOS 10 fax and email addresses. The communication module 144 interfaces with the password database 138, using the global tables 140 and the trip manager module 142, to associate data within the database 108. Accounting module 146 similarly interfaces with the other modules of the FOS 10 to manage billing information for the agents and clients of the aviation services provider, thereby completing the full scope of functionality for automating the provision of aviation services to air travelers.

All categories of users can send messages to the OC 12, using either the software 112 installed on a personal communication device or the web software 114. Users may leave notes for a particular task to the OC 12 through the web. For example, if a pilot cannot make it to a predetermined airport, he can inform the OC 12 in the context of the relevant specific trip or leg. If a customer decides they want to change the hotel, the customer or client can communicate that decision to the OC 12 by way of a message that will appear in the Message Center Screen 52 (FIG. 8) for appropriate action by one of the flight operators 13. Although not shown in the drawings, it should be understood that the flight operators 13 can also access the OC user interfaces discussed above through similar avenues for remote connections to the FOS 10.

Figure 15A:
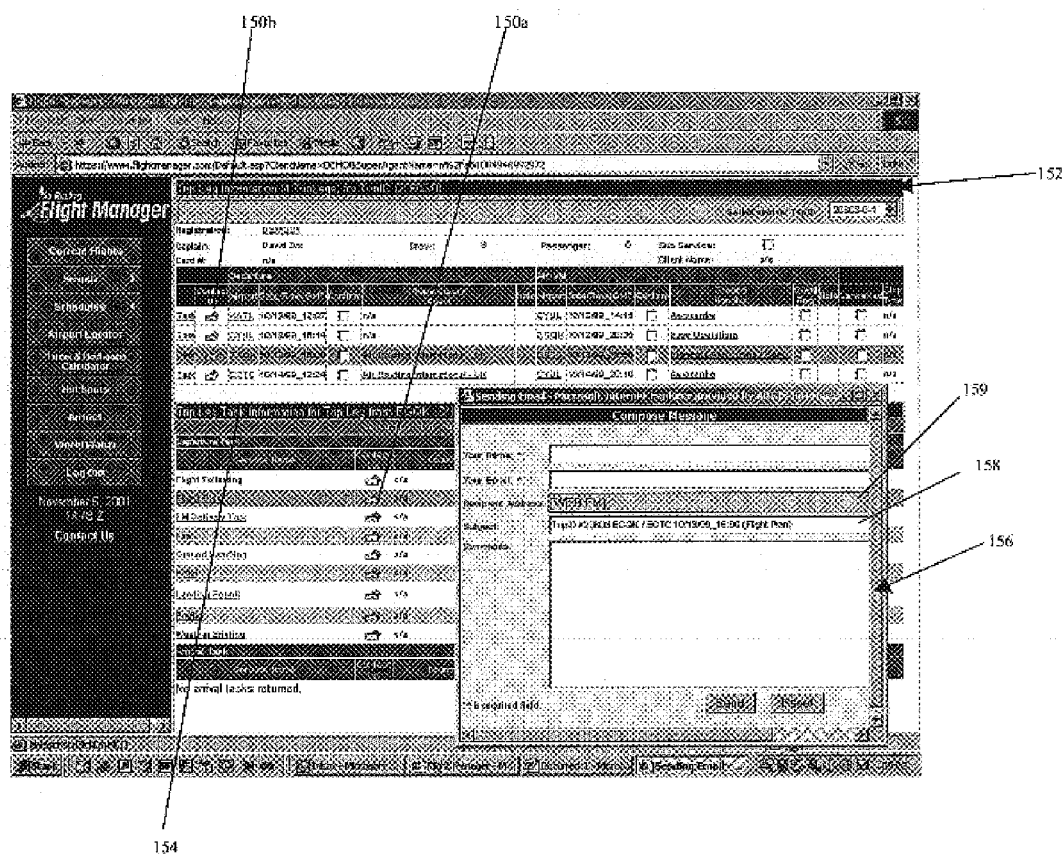
FIG. 15a illustrates a remote user screen display with the communication channel available to the user according to one example of the present invention.
Figure 15B:
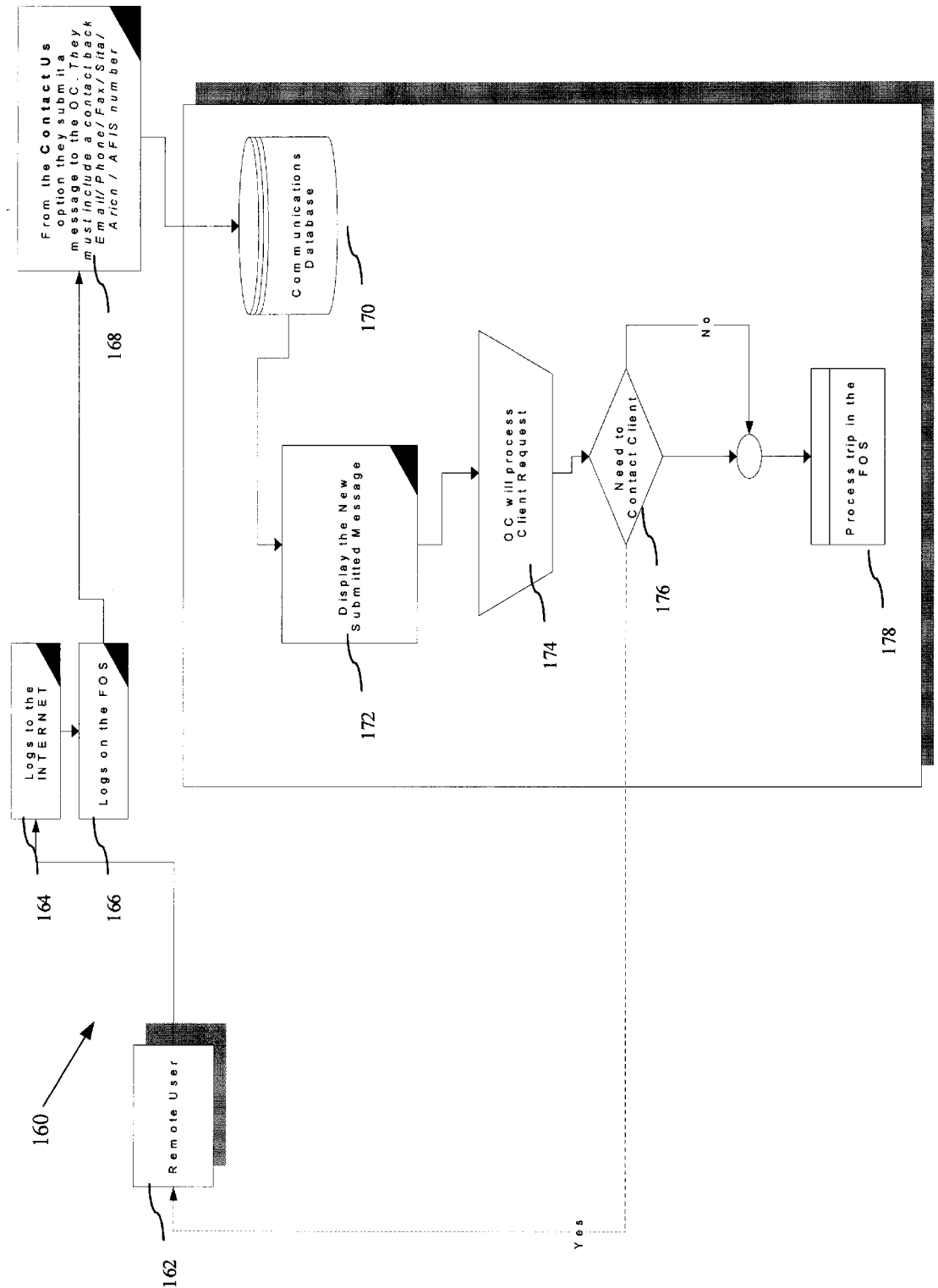

FIGS. 15a and 15b illustrate the context-sensitive message feature of the communication channel of the present invention. In the illustrated embodiment, each line item of information viewable by a remote user includes a "contact us" field represented by envelope icons 150a and 150b in FIG. 15a. When a user interacts with a particular user interface, such as the Trip Leg Information screen 152, and she wishes to communicate with the OC 12 some information relating to a particular trip leg, she can select the "Contact Us" icon 150b on that screen (152) or on a later drilled down screen, such as Trip Leg Task Information screen 154. When the "Contact Us" icon is selected, a communication software module is activated which causes an interface, such as the Compose Message screen 156, to appear. In the example shown in FIG. 15a, the user activated the icon 150a on the "Flight Plan" line in the Departure Task list for the Trip Leg departing from the airport "EGQK." As a result, in the Compose Message screen 156, the subject field 158 was automatically filled with appropriate context index information, including the trip ID number, the departure airport, the date and time of departure and the parenthetical "Flight Plan". In other words, the FOS 10 supplies a complete context for the message which is used to enable any of the flight operators 13 to place the message in its proper contextual location within the database 108, as discussed above with reference to FIG. 8. In addition, the FOS 10 inserts the database address as Recipient Address 159 to direct the message to the communications database 144. As can be appreciated, the FOS 10 could provide a more specific recipient address that would use the context index to direct the message to a particular one of the flight operators 13 or group of operators 13 responsible for the particular trip, leg, and departure task. In the illustrated example the message would need to be received and acted on by the person or persons responsible for the flight plan for this particular trip leg. On the other hand, it may be preferable to make all received messages available to all operators 13, in the manner customarily used for software "help desks" as a more efficient way of assuring that prompt action is taken in response to messages. The flight operator 13 who opens and takes action on the incoming message can effectively notify all flight operators 13 of that action using the interactive Message Center screens discussed above in the context of FIG. 8.

Before the user can Send the message to the OC, she must put information into "your Name" and Your Email" fields. That information enables the flight operators 13 to communicate back to the user in the manner preferred by the message sending user.

FIG. 15b is a flow diagram 160 illustrating the way that the FOS 10 handles messages sent through the Message Center screens. In the illustrated example, a remote user 162 logs onto the Internet (step 164) and further logs on to the FOS 10 (step 166), and then invokes the message feature by clicking on the "contact us" button as describe above. The user then fills in the required name and contact fields, composes a message using the Compose Message screen 156 (FIG. 15a) and clicks on the Send button (step 168). When the FOS 10 receives the information sent by the user through the communication channel, the received information—identified by its context index—is merged into or inserted into a large scale communications database (step 170). It is understood that information from multiple locations and operation personnel coming into this database may be sorted by the context index (e.g., the subject field of the message in this case), or may simply be stored in a predetermined location of the database. Once the newly arrived information is added to the database, it is displayed to the flight operators of the OC in relevant user interfaces (step 172) such as the Message Center screens shown in FIG. 8. The flight operators 13 can then process the new message immediately (step 174) by taking appropriate action, distributing the message to others using the FOS 10, and posting information relating to the action taken. The flight operators can view pertinent information and decide whether various remote users, or just the message sender, need to be contacted using the contact information provided in the message or similar information already available in the FOS (step 176). Any remote user will be contacted if needed. And if not, in a real time fashion, the flight operator processes the message in the FOS further. That process (step 178) can include any number of actions, including creating one or more new tasks, updating an existing task, changing tasks, creating client notes, changing or adding vendors, or sending the received information to predetermined contacts. The context index conveniently provides all of the information needed by a flight operator to quickly and efficiently take appropriate action in response to the received message.

As can now be appreciated, the FOS 10 provides a flexible, user friendly environment for accessing complete and up to the minute flight identification information, flight services information and environmental factors information. The FOS 10 makes information available to multiple users in real time, which enables its users to respond in a timely fashion to unexpected changes throughout the trip.

The FOS 10 also allows a user to log on remotely from multiple locations as long as a network connection can be made. This feature provides users with access to the information instantaneously, without being restricted to an operation center or a control room.

Additional screens illustrating various combinations of features of the FOS 10 available to a client user via the Internet are included as Appendix A.

The above detailed description is of a preferred embodiment of the present invention, and is used to illustrate and make clear the various features of the invention with reference to particular screen displays, which are merely examples of displays, components and processes of the method, system and computer program of the present invention. While the invention has been particularly shown and described with reference to a preferred embodiment, it will be understood by those skilled in the art that various changes in form and detail may be made without departing from the spirit and scope of the invention, as set forth in the following claims.

What is claimed is:

1. A method for planning and tracking at least one air travel trip, comprising:
   providing a plurality of user interfaces for entering and displaying a plurality of types of information about at least one air travel trip from an operational center, and for entering and submitting feedback information to the operational center from a remote location;
   providing at least one communication channel between the remote location and the operational center to enable a user at the remote location to provide the feedback information to the operational center; and
   associating the feedback information received on the communication channel by the operational center with the at least one air travel trip.

2. The method of claim 1 wherein the step of providing at least one communication channel further includes providing a message option on at least one of the plurality of user interfaces wherein the message option enables a user viewing the one user interface to enter the feedback information and to send the information to the operational center.

3. The method of claim 2 wherein the step of providing further includes associating the message option with the type of information displayed by the one user interface.

4. The method of claim 1 wherein the step of providing at least one communication channel further includes:
   invoking a user interface operable with the communication channel for the user to enter the feedback information;
   inserting automatically a predetermined context index for the user interface; and
   delivering the feedback information entered by the user through the communication channel to a predetermined database controlled by the operational center,
   wherein the delivered feedback information is processed based on the context index associated therewith.

5. The method of claim 4 further comprising:
   identifying recipients for the processed feedback information based on the predetermined context index; and
   distributing the feedback information to the identified recipients.

6. The method of claim 1 further comprising the step of:
   assigning access rights based on a user's need to know; and
   filtering information available based on the access rights assigned to the user.

7. The method of claim 1 wherein the plurality of user interfaces includes a trip setup screen having information necessary for planning an air travel trip comprising aircraft information, ground support task information, departure and arrival information, crew information, and client information.

8. The method of claim 1 wherein the plurality of user interfaces includes a communication information screen having contact information for completing at least one service task for the air travel trip.

9. The method of claim 1 wherein the plurality of user interfaces includes a status screen reflecting real time status of at least one service task for the air travel trip.

10. The method of claim 1 wherein the plurality of user interfaces includes one or more weather information screens.

11. The method of claim 1 wherein the plurality of user interfaces includes one or more flight route screens.

12. The method of claim 1 wherein the plurality of user interfaces includes a message center screen for listing messages entered by the users relevant to the at least one air travel trip.

13. The method of claim 1 further comprising generating one or more reports containing information about the at least one air travel trip.

14. A method for integrating air travel information relevant to planning and tracking one or more trips involving at least one flight, comprising:
   receiving basic information necessary to schedule the at least one flight;
   adding information relating to services to be performed in connection with the at least one flight; and
   communicating the added information associated with the at least one flight to authorized users by way of user interfaces available for viewing by selected remote users thereby making available, in real time, to the authorized users, through computer networks, the current status of the at least one flight from planning through execution of the flight.

15. The method of claim 14 wherein the step of receiving basic information further includes providing at least one communication channel between a remote location and an operational center to enable a user at the remote location to provide the feedback information to the operational center.

16. The method of claim 15 wherein the step of providing further includes providing a message option on at least one of the plurality of user interfaces wherein the message option enables a user viewing the at least one of the user interfaces to enter the feedback information and to send the information to the operational center.

17. The method of claim 15 wherein the step of providing further includes associating the message option with the type of information displayed by the at least one of the user interfaces.

18. The method of claim 15 wherein the step of providing at least one communication channel further includes:
   invoking a user interface operable with the communication channel for the user to enter the feedback information;
   inserting automatically a predetermined context index for the user interface; and
   delivering the feedback information entered by the user through the communication channel to a predetermined database controlled by the operational center,
   wherein the delivered feedback information is processed based on the context index associated therewith.

19. The method of claim 18 wherein the step of communicating further includes:
   identifying recipients for the processed feedback information based on the context index; and
   distributing the feedback information to the identified recipients.

20. The method of claim 14 wherein the basic information and the information relating to the services to be performed includes:

trip identification information;
tasks being performed during the trip; and
environmental factors affecting the trip.

21. The method of claim 20 wherein the trip identification information includes:
   a predefined trip identifier;
   a predetermined aircraft identifier;
   a predetermined pilot identifier;
   a predetermined client identifier;
   a set of predetermined service identifiers; and
   beginning and ending location identifiers.

22. The method of claim 20 wherein the environmental factors include:
   weather information;
   a satellite image of the earth; and
   radar shots of the earth.

23. The method of claim 20 wherein the tasks include:
   catering service;
   customs setup;
   flight plan;
   fuel service;
   ground service;
   landing permits;
   overflight permits;
   security guard service;
   landing slot reservation service;
   hotel accommodation;
   weather briefings; and
   visa information.

24. The method of claim 14 wherein the step of communicating further includes:
   providing a communication channel for the selected remote users to enter and send feedback messages; and
   associating the feedback messages with related information about the at least one flight.

25. A system for planning and tracking at least one air travel trip and for providing, to multiple users, access to information related to the air travel trip, comprising:
   an access grant interface for connecting a user to a database containing information related to the at least one air travel trip wherein the interface includes a filter based on user information maintained in the database whereby the user is granted access rights only to information needed by that user;
   a plurality of user interfaces for displaying a plurality of types of information about a real time progress of the planning and execution of the at least one trip; and
   at least one communication channel for receiving feedback information from the user,
   wherein the received feedback information further assists the planning and tracking of the at least one air travel trip.

26. The system of claim 25 further comprising means for associating the feedback information received on the communication channel with related information about the at least one trip.

27. The system of claim 25 wherein the communication channel includes a message option on at least one of the plurality of user interfaces that enables a user viewing a screen to enter the feedback information and to send the information directly to an operational center.

28. The system of claim 25 wherein the communication channel further includes:
   means for invoking a user interface operable with the communication channel for the user to enter the feedback information;
   means for inserting automatically a predetermined context index information for the user interface; and
   means for delivering the feedback information entered by the user through the communication channel to a predetermined database controlled by the operational center,
   wherein the delivered feedback information is processed based on the context index associated therewith.

29. The system of claim 25 further comprising:
   means for identifying recipients for the processed feedback information based on the context index; and
   means for distributing the feedback information to the identified recipients.

30. The system of claim 25 further comprising:
   means for assigning access rights based on a user's need to know; and
   means for filtering information available based on the access rights assigned to the user.

31. The system of claim 25 wherein the plurality of user interfaces includes a trip setup screen having information necessary for planning an air travel trip comprising aircraft information, ground support task information, departure and arrival information, crew information, and client information.

32. The system of claim 25 wherein the plurality of user interfaces includes a communication information screen having contact information necessary for completing a plurality of service tasks for the air travel trip.

33. The system of claim 25 wherein the plurality of user interfaces includes a status screen reflecting real time status of a plurality of service tasks for the air travel trip.

34. The system of claim 25 wherein the plurality of user interfaces includes one or more weather information screens.

35. The system of claim 25 wherein the plurality of user interfaces includes one or more flight route screens.

36. The system of claim 25 wherein the plurality of user interfaces includes a message center screen for listing notes posted by the users relating to the at least one air travel trip.

37. The system of claim 25 further comprising a report generator for generating one or more reports relating to the at least one air travel trip.

38. A computer program for integrating information relating to the planning and tracking of one or more trips involving at least one flight comprising instructions for:
   collecting flight schedule-related information for creating a trip plan having a plurality of tasks associated with the plan;
   updating the trip plan based on feedback messages sent by one or more remote authorized users; and
   making available real time updates of the trip plan to the remote authorized users through one or more computer networks.

39. The computer program of claim 38 wherein the instructions for updating further include instructions for:
   creating a communication channel for the users to enter the feedback messages; and
   associating the feedback messages with related tasks of the trip plan.

40. The computer program of claim 39 further including instructions for processing the feedback messages based on the context in which the message was created.

* * * * *

UNITED STATES PATENT AND TRADEMARK OFFICE
CERTIFICATE OF CORRECTION

PATENT NO. : 6,754,581 B1  
DATED : June 22, 2004  
INVENTOR(S) : Scott Blachowicz et al.

It is certified that error appears in the above-identified patent and that said Letters Patent is hereby corrected as shown below:

<u>Drawings,</u>
Delete "Reference Numeral 18 was added".

Signed and Sealed this

Twenty-eighth Day of September, 2004

JON W. DUDAS  
*Director of the United States Patent and Trademark Office*